United States Patent
Hwang et al.

(10) Patent No.: US 12,494,835 B2
(45) Date of Patent: Dec. 9, 2025

(54) COMMUNICATION SYSTEM

(71) Applicant: DELTA ELECTRONICS, INC., Taoyuan (TW)

(72) Inventors: Chieh-Tsao Hwang, Taoyuan (TW); Siang-Rong Hsu, Taoyuan (TW); Yen-Ting Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 24 days.

(21) Appl. No.: 18/585,066

(22) Filed: Feb. 23, 2024

(65) Prior Publication Data

US 2024/0195481 A1  Jun. 13, 2024

Related U.S. Application Data

(63) Continuation-in-part of application No. 17/929,751, filed on Sep. 6, 2022.

(30) Foreign Application Priority Data

May 9, 2022 (CN) .......................... 202210498484.1

(51) Int. Cl.
*H04L 23/02* (2006.01)
*H01Q 3/24* (2006.01)
(Continued)

(52) U.S. Cl.
CPC ............. *H04B 7/0695* (2013.01); *H01Q 3/24* (2013.01); *H01Q 21/28* (2013.01)

(58) Field of Classification Search
CPC .......... H01Q 21/12; H01Q 21/28; H01Q 3/24; H01Q 1/246; H01Q 1/24; H01Q 19/30;
(Continued)

(56) References Cited

U.S. PATENT DOCUMENTS

| 4,973,972 A | 11/1990 | Huang |
| 5,973,641 A | 10/1999 | Smith et al. |

(Continued)

FOREIGN PATENT DOCUMENTS

| CN | 111370862 A | 7/2020 |
| CN | 111725630 A | 9/2020 |

(Continued)

OTHER PUBLICATIONS

Tiago Varum et. al, "Nonuniform Broadband Circularly Polarized Antenna Array for Vehicular Communications", IEEE Transactions on Vehicular Technology, Sep. 2016, vol. 65. No. 9.

*Primary Examiner* — Khai Tran
(74) *Attorney, Agent, or Firm* — CKC & Partners Co., LLC

(57) ABSTRACT

A communication system is disclosed. The communication system includes an active antenna set and a passive antenna set. The active antenna set includes at least one active antenna array, the at least one active antenna array is configured to transmit a first signal through at least one active beam group, and the at least one active beam group covers a first coverage area with a first coverage angle. The passive antenna set includes at least one passive antenna subset, the at least one passive antenna subset is configured to transmit a second signal through at least one passive beam group, and the at least one passive beam group covers a second coverage area with a second coverage angle. The first coverage area and the second coverage area do not overlap.

16 Claims, 13 Drawing Sheets

(51) Int. Cl.
*H01Q 21/28* (2006.01)
*H04B 7/06* (2006.01)

(58) Field of Classification Search
CPC ........ H01Q 19/32; H01Q 21/00; H01Q 19/10; H04B 7/00695; H04B 7/0617; H04B 7/0413
USPC .................. 375/262, 260, 267, 299; 343/702
See application file for complete search history.

(56) References Cited

U.S. PATENT DOCUMENTS

| | | | |
|---|---|---|---|
| 6,184,828 | B1 | 2/2001 | Shoki |
| 6,417,806 | B1* | 7/2002 | Gothard ............... H01Q 21/061 |
| | | | 343/702 |
| 7,839,350 | B2 | 11/2010 | Nagai |
| 10,062,972 | B1 | 8/2018 | Strassner, II |
| 10,074,910 | B1 | 9/2018 | Buckley et al. |
| 11,749,881 | B2* | 9/2023 | Hou ..................... H01Q 19/108 |
| | | | 343/835 |
| 2004/0100402 | A1 | 5/2004 | McCandless |
| 2004/0150568 | A1* | 8/2004 | Chiang .................. H01Q 1/24 |
| | | | 343/702 |
| 2008/0036662 | A1 | 2/2008 | Iwata et al. |
| 2010/0295743 | A1* | 11/2010 | Pu ........................... H01Q 1/48 |
| | | | 343/749 |
| 2012/0086601 | A1 | 4/2012 | Lee et al. |
| 2013/0090076 | A1* | 4/2013 | Teillet ..................... H01Q 3/34 |
| | | | 455/127.2 |
| 2013/0116011 | A1* | 5/2013 | Lee ........................ H01Q 1/246 |
| | | | 455/562.1 |
| 2016/0156109 | A1 | 6/2016 | Anderson et al. |
| 2017/0180064 | A1* | 6/2017 | Su ......................... H04B 7/0621 |
| 2018/0241135 | A1 | 8/2018 | Furlan et al. |
| 2018/0278219 | A1 | 9/2018 | Abe |
| 2018/0309210 | A1 | 10/2018 | Sudo |
| 2019/0033428 | A1* | 1/2019 | Rowell .................... G01V 3/12 |
| 2019/0252755 | A1 | 8/2019 | Shamsinejad et al. |
| 2019/0393616 | A1 | 12/2019 | Pelletti et al. |
| 2020/0227821 | A1 | 7/2020 | Wu et al. |
| 2020/0227835 | A1 | 7/2020 | Kim et al. |
| 2020/0303811 | A1 | 9/2020 | Saito et al. |
| 2020/0389800 | A1 | 12/2020 | Laghate et al. |
| 2020/0411950 | A1 | 12/2020 | Kuroda |
| 2021/0250079 | A1 | 8/2021 | Ariumi |
| 2021/0305718 | A1 | 9/2021 | Li et al. |
| 2022/0302603 | A1 | 9/2022 | Chieh et al. |
| 2022/0416435 | A1 | 12/2022 | Liu et al. |
| 2023/0179237 | A1 | 6/2023 | Torres et al. |
| 2024/0072434 | A1 | 2/2024 | Braun et al. |
| 2024/0195481 | A1 | 6/2024 | Hwang et al. |
| 2024/0258705 | A1 | 8/2024 | Ding et al. |

FOREIGN PATENT DOCUMENTS

| | | |
|---|---|---|
| CN | 112201952 A | 1/2021 |
| CN | 112437998 A | 3/2021 |
| CN | 113013567 A | 6/2021 |
| CN | 113270730 A | 8/2021 |
| CN | 119153962 A | 12/2024 |
| EP | 0493014 A1 | 7/1992 |
| EP | 1657783 B1 | 8/2007 |
| JP | H02164107 A | 6/1990 |
| JP | H0897620 A | 4/1996 |
| JP | H10303612 A | 11/1998 |
| JP | H11266118 A | 9/1999 |
| JP | 2018186337 A | 11/2018 |
| TW | 201401655 A | 1/2014 |
| TW | I706598 B | 10/2020 |
| WO | 2022093026 A1 | 5/2022 |

* cited by examiner

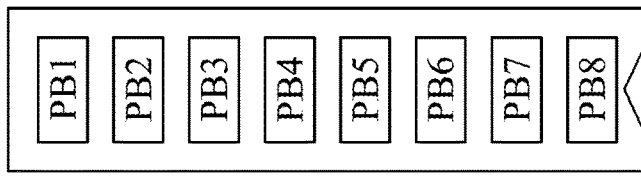
Fig. 10C
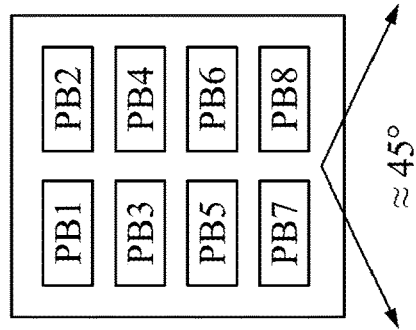
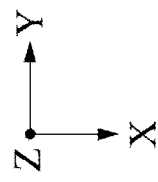
Fig. 10B
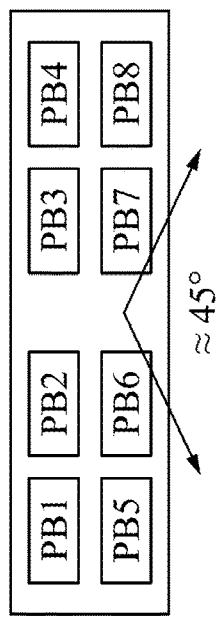
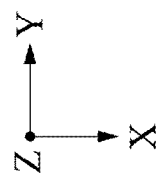
Fig. 10A

COMMUNICATION SYSTEM

CROSS-REFERENCE TO RELATED APPLICATION

This application is a Continuation-in-part of U.S. application Ser. No. 17/929,751, filed Sep. 6, 2022, which claims priority to Chinese Application Serial Number 202210498484.1, filed May 9, 2022, which is herein incorporated by reference in its entirety.

BACKGROUND

Field of Disclosure

The present disclosure relates to a technology of a communication system, and more particularly, to a communication system with passive antenna subsets.

Description of Related Art

Active antenna arrays are often used in the wireless communication devices such as communication systems. If one active antenna array includes a coverage area of 120 degrees, it takes 3 sets of active antenna arrays to cover a coverage area of 360 degrees. However, the power consumption and the cost of the active antenna arrays are high. Therefore, how to decrease the power consumption and the cost of the communication system while maintaining the coverage area of the communication system is needed.

SUMMARY

The disclosure provides a communication system. The communication system includes an active antenna set and a passive antenna set. The active antenna set includes at least one active antenna array, the at least one active antenna array is configured to transmit a first signal through at least one active beam group, and the at least one active beam group covers a first coverage area with a first coverage angle. The passive antenna set includes at least one passive antenna subset, the at least one passive antenna subset is configured to transmit a second signal through at least one passive beam group, and the at least one passive beam group covers a second coverage area with a second coverage angle. The first coverage area and the second coverage area do not overlap.

The disclosure provides a communication system. The communication system includes several passive antenna subsets. Each of the passive antenna subsets is configured to transmit a first signal through a passive beam group, in which the passive beam group covers an area with a coverage angle.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 10A is a schematic diagram illustrating a passive antenna subset according to some embodiments of the present disclosure.

FIG. 10B is a schematic diagram illustrating a passive antenna subset according to some embodiments of the present disclosure.

FIG. 10C is a schematic diagram illustrating a passive antenna subset according to some embodiments of the present disclosure.

DETAILED DESCRIPTION

Figure 1:
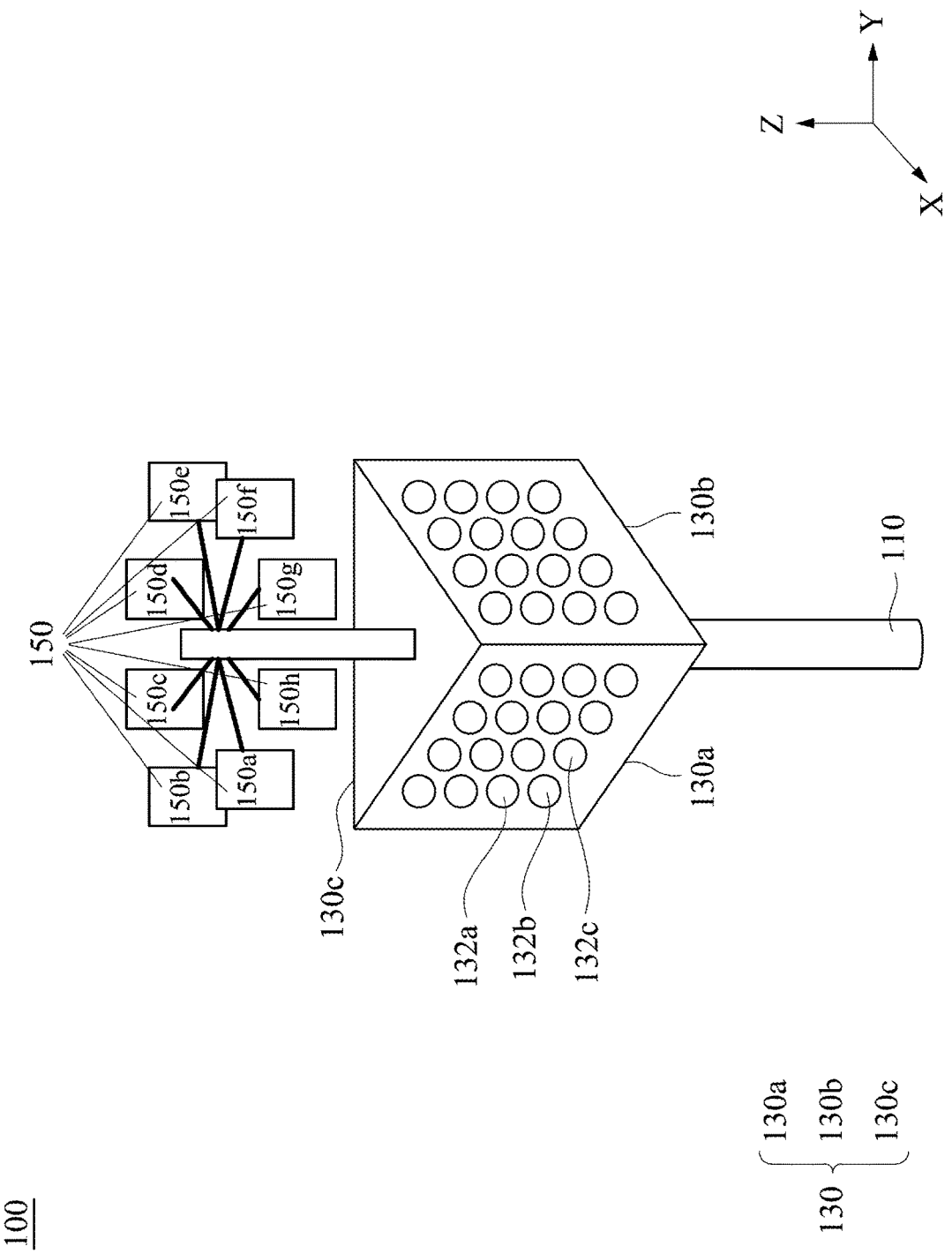
FIG. 1 is a schematic diagram illustrating a communication system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a communication system 100 according to some embodiments of the present disclosure. As illustrated in FIG. 1, the communication system 100 includes a base station 110. The base station 110 includes an active antenna set 130. The communication system 100 further includes a passive antenna set 150. The active antenna set 130 includes active antenna arrays 130a to 130c. The passive antenna set 150 includes passive antenna subsets 150a to 150h.

As illustrated in FIG. 1, each of the active antenna arrays 130a to 130c includes several antenna elements. For example, the active antenna array 130a includes several antenna elements 132a to 132c.

As illustrated in FIG. 1, the passive antenna set 150 lies above the active antenna set 130. In another embodiment, the passive antenna set 150 lies below the active antenna set 130.

In some embodiments, the active antenna arrays 130a to 130c lines on the same X-Y plane, and the passive antenna subsets 150a to 150h lies on the same X-Y plane.

Each of the active antenna arrays 130a to 130c lies on an antenna panel, similarly, each of the passive antenna subsets 150a to 150h lies on an antenna panel. Different active antenna arrays 130a to 130c or different passive antenna subsets 150a to 150h lies on different antenna panels.

Moreover, the active antenna arrays 130a to 130c and the passive antenna subsets 150a to 150h lies perpendicular to the XY plane.

The active antenna arrays 130a to 130c face different directions from each other, and the passive antenna subsets face different directions from each other.

In some embodiments, each of the active antenna arrays 130a to 130c includes a coverage area with coverage angle being 120 degrees, and each of the passive antenna subsets 150a to 150h includes a coverage area with coverage angle being 45 degrees. However, the degrees of the coverage area are for illustrative purposes only, and the embodiments of the present disclosure are not limited thereto.

It should be noted that, in FIG. 1, several passive antenna subsets 150a to 150h and several active antenna arrays 130a to 130c are illustrated. However, the number of the passive antenna subsets and the number of the active antenna arrays included in the communication system 100 can be adjusted. Example of the communication system with different number of the passive antenna subsets and the number of the active antenna arrays will be illustrated in the following FIG. 2 and FIG. 3.

In some embodiments, the passive antenna subsets and the active antenna arrays included in the communication system 100 can be operated selectively. For example, in one embodiment, the active antenna array 130a, the passive antenna subset 150a and the passive antenna subset 150b are operated while the others are not operated.

Figure 2:
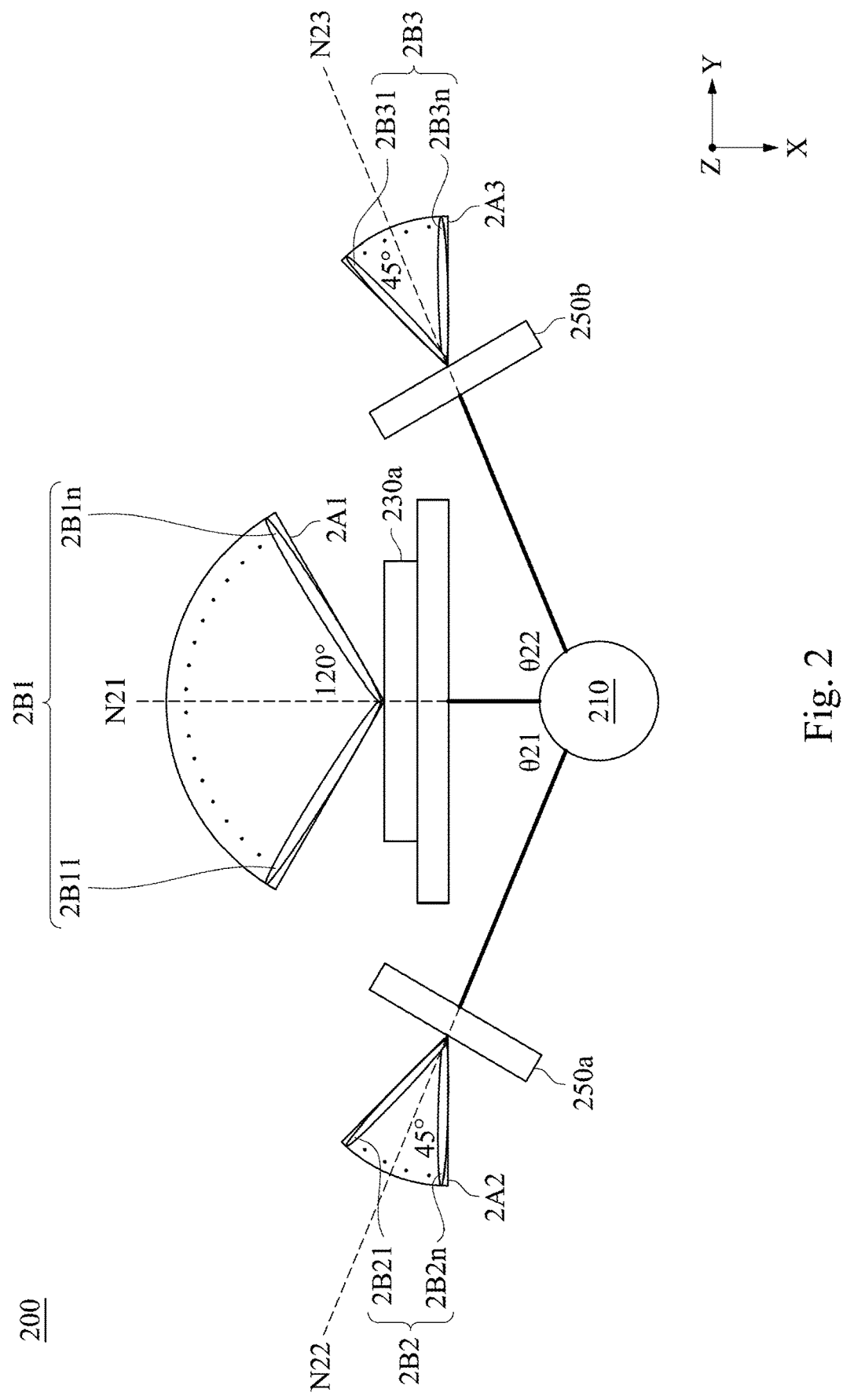
FIG. 2 is a top perspective view of a communication system according to some embodiments of the present disclosure.

Reference is made to FIG. 2. FIG. 2 is a top perspective view of a communication system 200 according to some embodiments of the present disclosure. As illustrated in FIG. 2, the communication system 200 includes an active antenna array 230a and two passive antenna subsets 250a and 250b. The active antenna array 230a is included in the base station 210, and two passive antenna subsets 250a and 250b couples to the base station 210.

The active antenna array 230a includes an active beam group 2B1, and the active beam group 2B1 includes active beams 2B11 to 2B1n. The active beam group 2B1 covers an area 2A1 with an angle of 120 degrees. The active antenna array 230a transmits signals through the active beam group 2B1.

The passive antenna subset 250a includes a passive beam group 2B2, and the passive beam group 2B2 includes passive beams 2B21 to 2B2n. The passive beam group 2B2 covers an area 2A2 with an angle of 45 degrees. Similarly, the passive antenna subset 250b includes a passive beam group 2B3, and the passive beam group 2B3 includes passive beams 2B31 to 2B3n. The passive beam group 2B3 covers an area 2A3 with an angle of 45 degrees. The passive antenna subset 250a transmits signals through the passive beam group 2B2, and the passive antenna subset 250b transmits signals through the passive beam group 2B3.

As illustrated in FIG. 2, the area 2A1, the area 2A2 and the area 2A3 do not overlap with each other on the X-Y plane. The coverage angle of the coverage area of the communication system 200 equals the angle of the area 2A1 plus the angle of the area 2A2 plus the angle of the area 2A3. Therefore, the area 2A1, the area 2A2 and the area 2A3 form coverage with 210 degrees on the X-Y plane together.

The active antenna array 230a includes a normal N21 on the XY plane, the passive antenna subset 250a includes a normal N22 on the XY plane, and the passive antenna subset 250b includes a normal N23 on the XY plane. When the active antenna array 230a lies next to the passive antenna subset 250a, a configuration angle $\theta21$ between the active antenna array 230a and the passive antenna subset 250a is equal to half of the coverage angle of the passive antenna subset 250a plus half of the coverage angle of the active antenna array 230a. Similarly, when the active antenna array 230a lies next to the passive antenna subset 250b, a configuration angle $\theta22$ between the active antenna array 230a and the passive antenna subset 250b is equal to half of the coverage angle of the passive antenna subset 250b plus half of the coverage angle of the active antenna array 230a.

Figure 3:
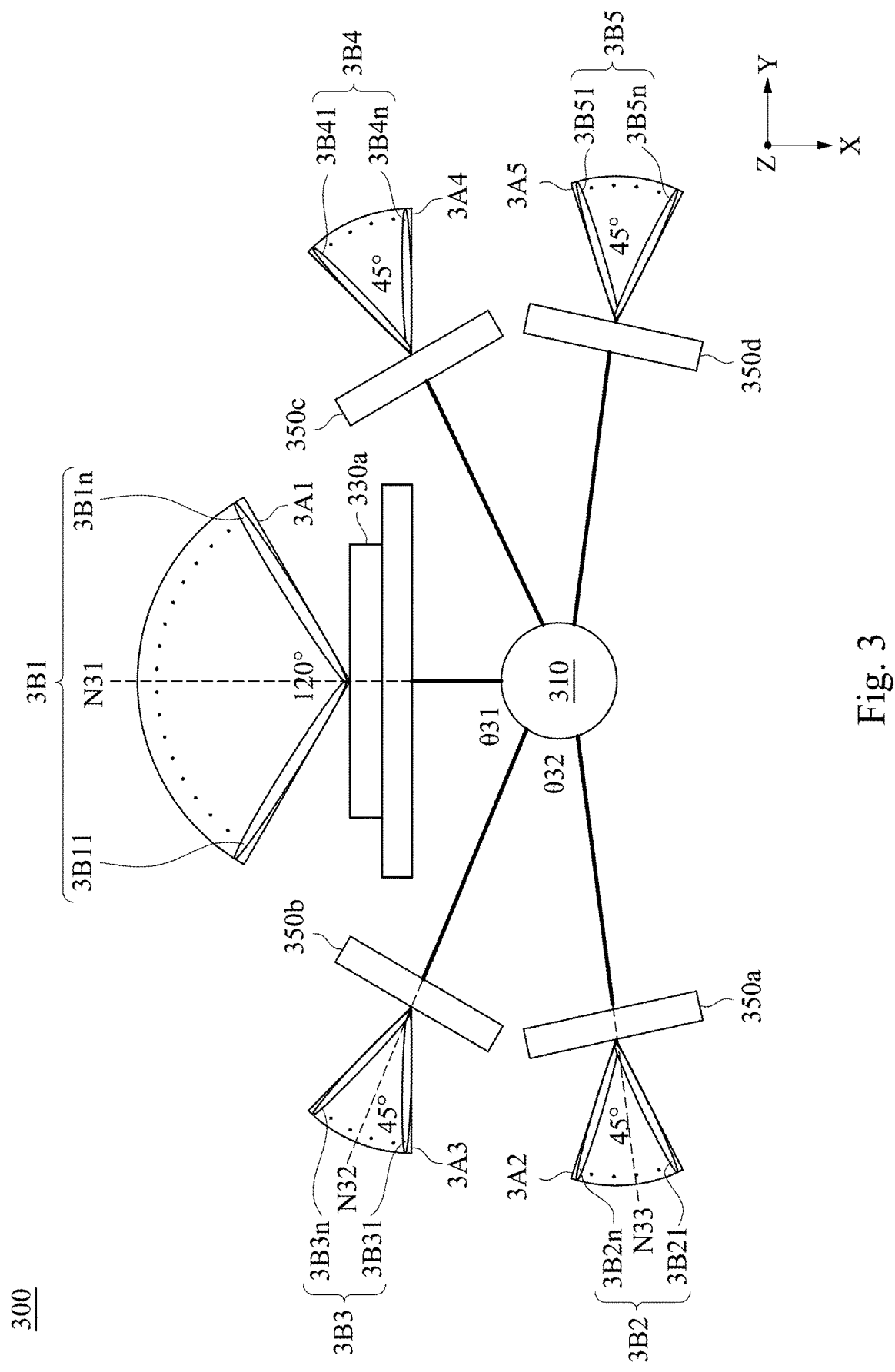
FIG. 3 is a top perspective view of a communication system according to some embodiments of the present disclosure.

Reference is made to FIG. 3. FIG. 3 is a top perspective view of a communication system 300 according to some embodiments of the present disclosure. As illustrated in FIG. 3, the communication system 300 includes an active antenna array 330a and four passive antenna subsets 350a to 350d. The active antenna array 330a is included in the base station 310 of the communication system 300, and four passive antenna subsets 350a to 350d couples to the base station 310.

The active antenna array 330a includes an active beam group 3B1, and the active beam group 3B1 includes active beams 3B11 to 3B1n. The active beam group 3B1 covers an area 3A1 with an angle of 120 degrees. The active antenna array 330a transmits signals through the active beam group 3B1.

The passive antenna subset 350a includes a passive beam group 3B2, and the passive beam group 3B2 includes passive beams 3B21 to 3B2n. The passive beam group 3B2 covers an area 3A2 with an angle of 45 degrees. The other passive antenna subsets 350b to 350d are similar to the passive antenna subset 350a and will not be described in detail here. The passive antenna subsets 350a to 350d transmit signals through the passive beam group 3B2 to 3B5.

As illustrated in FIG. 3, the areas 3A1 to 3A5 do not overlap with each other on the X-Y plane. The coverage angle of the coverage area of the communication system 300 equals the angle of the area 3A1 plus the angles of the areas 3A2 to 3A5. Therefore, the areas 3A1 to 3A5 form coverage with 300 degrees on the X-Y plane together.

The active antenna array 330a includes a normal N31 on the XY plane, the passive antenna subset 350b includes a normal N32 on the XY plane, and the passive antenna subset 350a includes a normal N33 on the XY plane. When the active antenna array 330a lies next to the passive antenna subset 350b, a configuration angle $\theta31$ between the active antenna array 330a and the passive antenna subset 350b is equal to half of the coverage angle of the passive antenna subset 350b plus half of the coverage angle of the active antenna array 330a.

Similarly, when the passive antenna subset 350b lies next to the passive antenna subset 350a, a configuration angle $\theta32$ between the passive antenna subset 350b and the passive antenna subset 350a is equal to half of the coverage angle of the passive antenna subset 350b plus half of the coverage angle of the passive antenna subset 350a.

The number of the passive antenna subsets and the number of the active antenna arrays are not limited to the numbers as illustrated in FIGS. 2 and 3. The number of the passive antenna subsets and the number of the active antenna arrays may be adjusted according to the needs. Furthermore, the location of the passive antenna subsets and the active antenna arrays may also be adjusted to be close to each other or far away from each other.

According to FIG. 2 as illustrated above, the active antenna set of the communication system 200 includes one active antenna array, and the passive antenna set of the communication system 200 includes two passive antenna subsets. The active beam group of the active antenna set of the communication system 200 covers a coverage area with a coverage angle of 120 degrees, and the passive beam group of the passive of the communication system 200 covers a coverage area with a coverage angle of 90 degrees. The communication system 200 covers a coverage area with a coverage angle of 210 degrees in total.

According to FIG. 3 as illustrated above, the active antenna set of the communication system 300 includes one active antenna array, and the passive antenna set of the communication system 300 includes four passive antenna subsets. The active beam group of the active antenna set of the communication system 300 covers a coverage area with a coverage angle of 120 degrees, and the passive beam group of the passive of the communication system 300 covers a coverage area with a coverage angle of 180 degrees. The communication system 300 covers a coverage area with a coverage angle of 300 degrees in total.

By adjusting the number of the active antenna arrays and the number of the passive antenna subsets, the coverage angle of the communication system can be adjusted.

Figure 4:
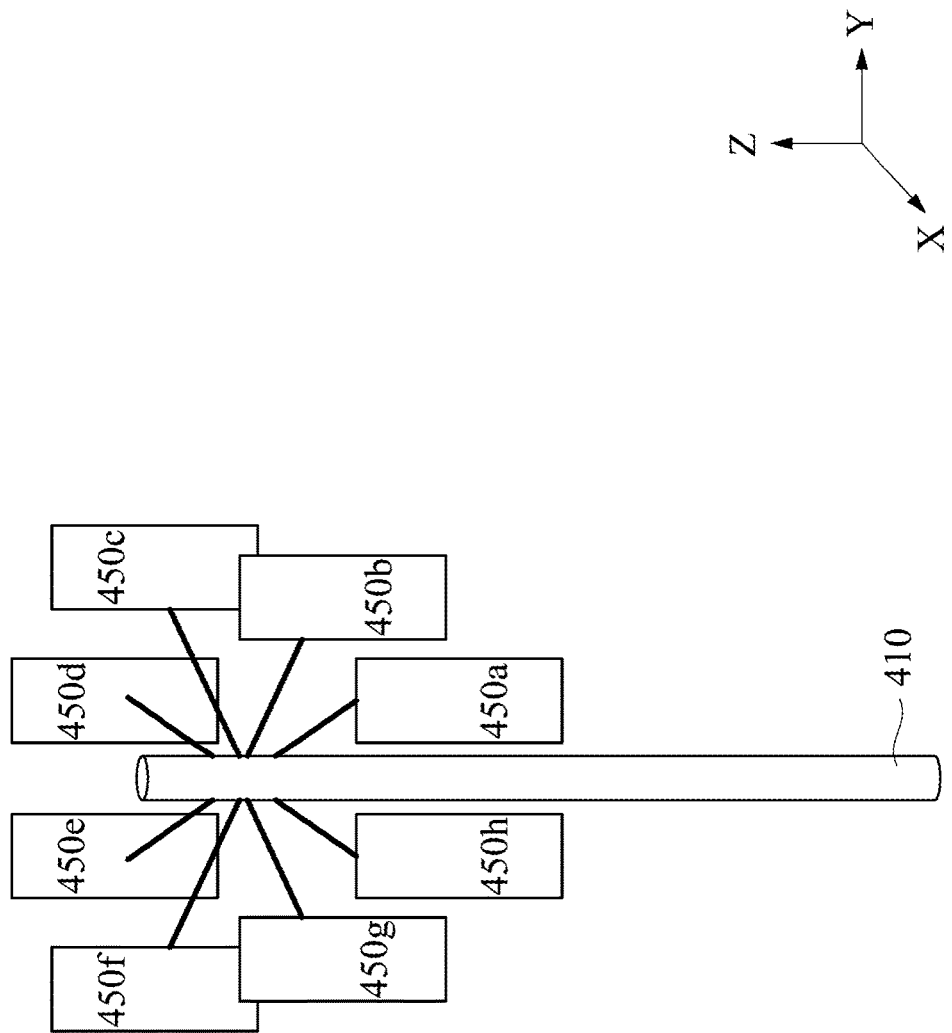
FIG. 4 is a schematic diagram illustrating a communication system according to some embodiments of the present disclosure.

Reference is made to FIG. 4. FIG. 4 is a schematic diagram illustrating a communication system 400 according to some embodiments of the present disclosure. As illustrated in FIG. 4, the communication system 400 includes a base station 410 and a passive antenna set 450. The passive antenna set 450 includes passive antenna subsets 450a to 450h.

It should be noted that, in FIG. 4, several passive antenna subsets 450a to 450h are illustrated. However, the number of the passive antenna subsets included in the communication system 400 can be adjusted. For example, in one embodiment, the communication system 400 includes only passive antenna subsets 450a and 450b.

In some embodiments, the passive antenna subsets 450a to 450h in the communication system 400 can be operated selectively. For example, in one embodiment, the passive antenna subset 450a and the passive antenna subset 450b are operated while the others are not operated.

Figure 5A:
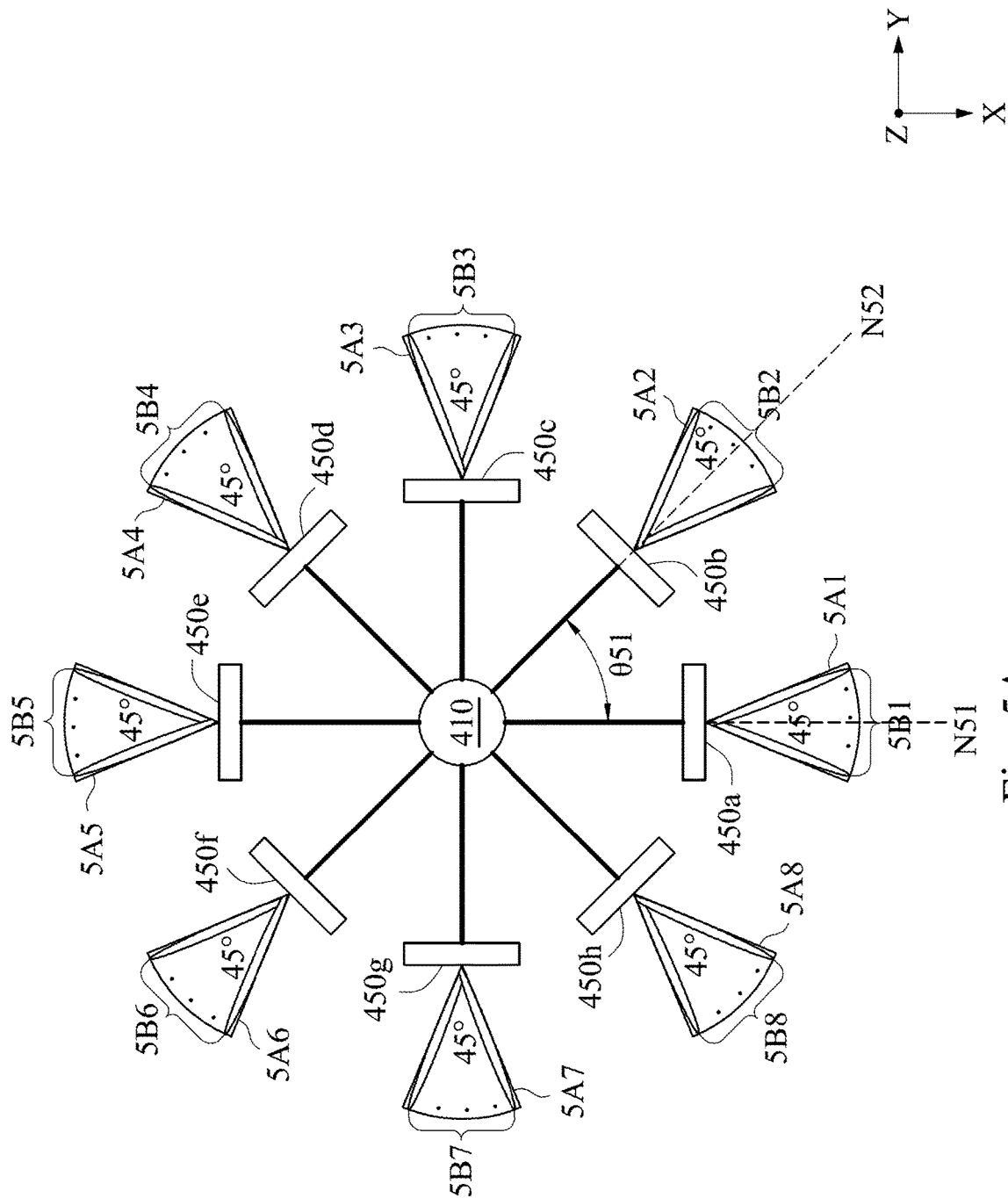
FIG. 5A is a top perspective view of a communication system according to some embodiments of the present disclosure.

Reference is made to FIG. 5A. FIG. 5A is a top perspective view of a communication system 400 according to some embodiments of the present disclosure. As illustrated in FIG. 5A, the communication system 400 includes eight passive antenna subsets 450a to 450h. The passive antenna subsets 450a to 450h couples to the base station 410.

Each of the passive antenna subsets 450a to 450h includes one of the passive beam groups 5B1 to 5B8, and each of the passive beam groups 5B1 to 5B8 covers an area with an angle of 45 degrees. Each of the passive antenna subsets 450a to 450h transmits signals through one of the passive beam groups 5B1 to 5B8 in correspondence.

For example, the passive antenna subset 450a includes a passive beam group 5B1, and the passive beam group 5B1 includes several passive beams. The passive beam group 5B1 covers an area 5A1 with an angle of 45 degrees. The other passive antenna subsets 450b to 450h are similar to the passive antenna subset 450a and will not be described in detail here.

As illustrated in FIG. 5A, the areas 5A1 to 5A8 do not overlap with each other on the X-Y plane. The coverage angle of the coverage area of the communication system 400 equals the angle of the area 5A1 plus the angles of the areas 5A2 to 5A8. Therefore, the areas 5A1 to 5A8 form coverage with 360 degrees on the X-Y plane together.

The passive antenna subset 450a includes a normal N51 on the XY plane, and the passive antenna subset 450b includes a normal N52 on the XY plane. When the passive antenna subset 450a lies next to the passive antenna subset 450b, a configuration angle θ51 between the passive antenna subset 450a and the passive antenna subset 450b is equal to half of the coverage angle of the passive antenna subset 450a plus half of the coverage angle of the passive antenna subset 450b.

The number of the passive antenna subsets 450b to 450h as illustrated in FIG. 5A is for illustrative purposes only and may be adjusted according to the needs. For example, the communication system 400 may include only passive antenna subsets 450a and 450b, so as to form coverage with 90 degrees on the X-Y plane together. In another embodiment, the communication system 400 may include only passive antenna subsets 450a, 450b, 450c and 450d, so as to form coverage with 180 degrees on the X-Y plane together.

In FIG. 5A, the passive antenna subsets 450a to 450h are close to each other, while in some other embodiments, if the communication system 400 includes seven or less than seven passive antenna subsets, the passive antenna subsets may be far away from each other. For example, as illustrated in FIG. 5A, the angle θ51 between the passive antenna subsets 450a and 450b is 45 degrees. Similarly, the angle between each two neighboring passive antenna subsets is 45 degrees in FIG. 5A. The passive antenna subsets 450a to 450h as illustrated in FIG. 5A are close to each other.

Figure 5B:
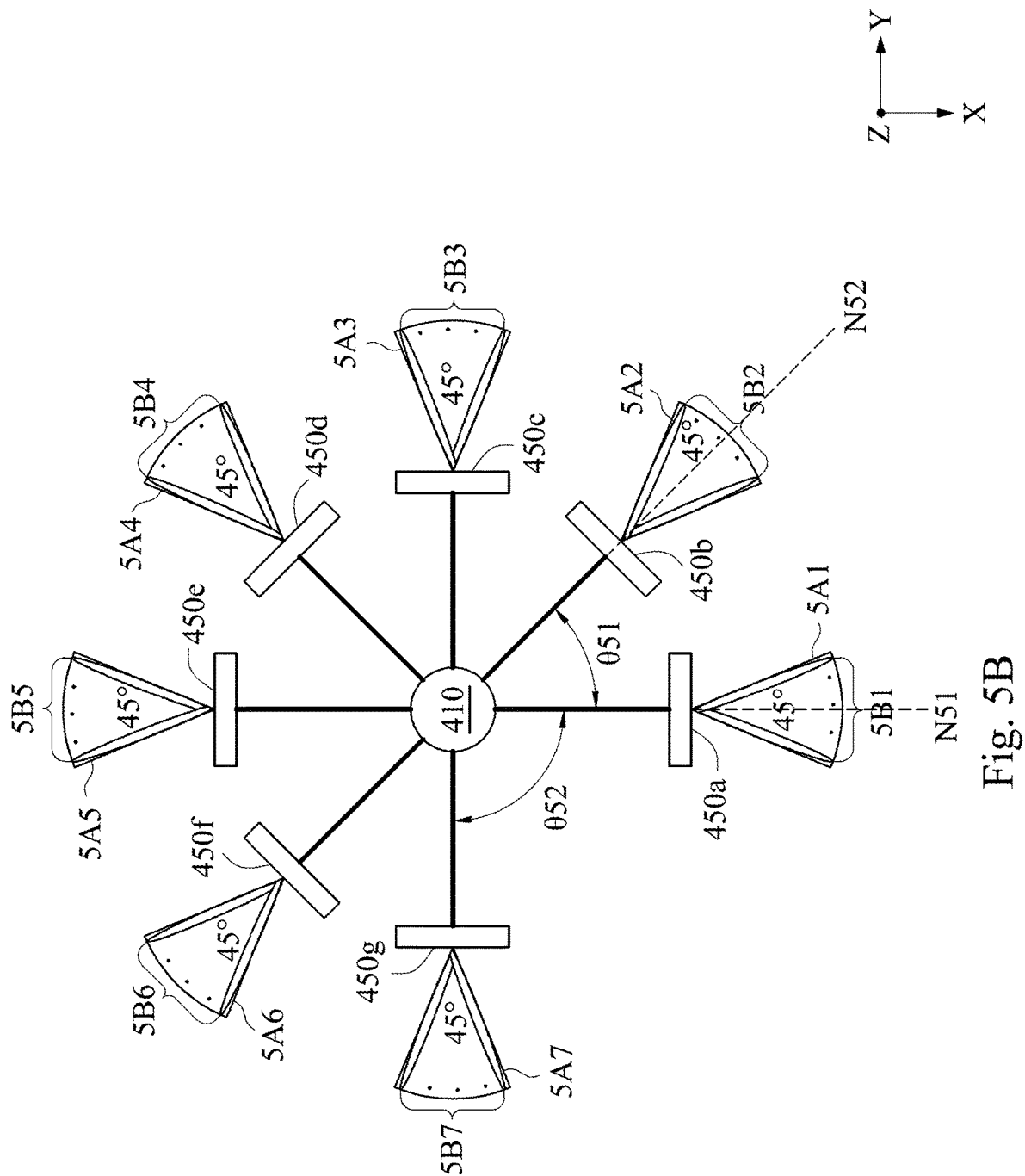
FIG. 5B is a top perspective view of another communication system according to some embodiments of the present disclosure.

Reference is made to FIG. 5B. FIG. 5B is a top perspective view of another communication system 500 according to some embodiments of the present disclosure. The difference between FIG. 5B and FIG. 5A is that the communication system 500 in FIG. 5B includes seven passive antenna subsets 450a to 450g, while the communication system 400 in FIG. 5A includes eight passive antenna subsets 450a to 450h. As illustrated in FIG. 5B, the angle θ51 between the passive antenna subsets 450a and 450b is 45 degrees, while the angle θ52 between the passive antenna subsets 450a and 450g is more than 45 degrees. It is defined that the passive antenna subsets 450a and 450g are far away from each other, and that the passive antenna subsets 450a and 450b are close to each other.

Figure 6:
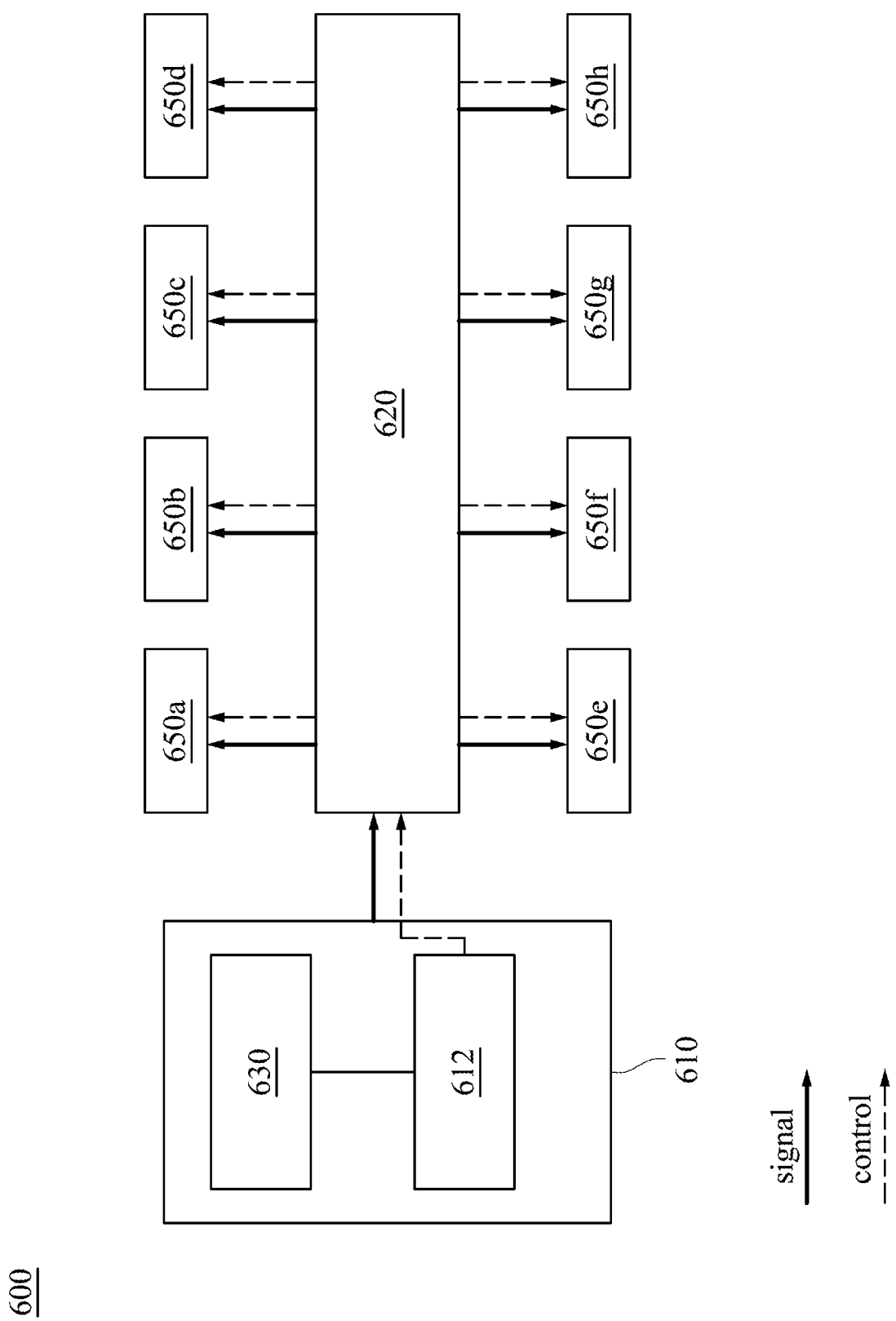
FIG. 6 is a block diagram illustrating a communication system according to some embodiments of the present disclosure.

Reference is made to FIG. 6. FIG. 6 is a block diagram illustrating a communication system 600 according to some embodiments of the present disclosure. As illustrated in FIG. 6, the communication system 600 includes a base station 610, an adapter board 620, and several passive antenna subsets 650a to 650h. The base station 610 includes an active antenna set 630 and a control circuit 612.

In the connection relationship, the base station 610 couples to the adapter board 620, and the adapter board 620 couples to the passive antenna subsets 650a to 650h.

The control circuit 612 couples to the active antenna set 630 and the passive antenna subsets 650a to 650h. The passive antenna subsets 650a to 650h form a passive antenna set.

The control circuit 612 controls the generation of the passive beams of the passive antenna set and the generation of the active beams of the active antenna set 630 by transmitting control signals to the active antenna set 630 and the passive antenna set.

Figure 7:
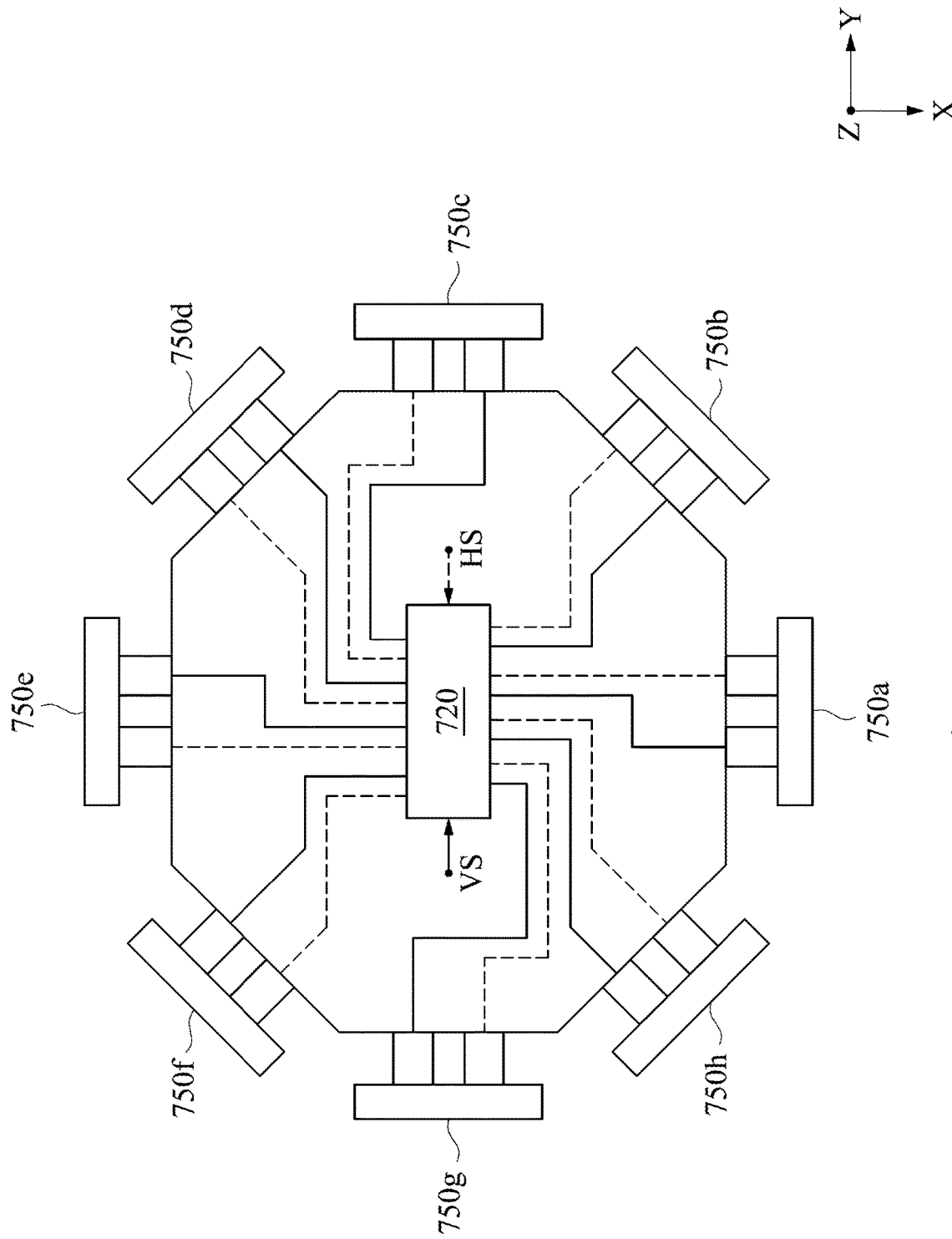
FIG. 7 is a top perspective view of an adapter board according to some embodiments of the present disclosure.

Reference is made to FIG. 7. FIG. 7 is a top perspective view of an adapter board 720 according to some embodiments of the present disclosure. As illustrated in FIG. 7, the adapter board 720 is an octagonal board with eight sides. Each of the sides connects to one of the passive antenna subsets 750*a* to 750*h*.

The adapter board 720 receives control signals, vertically polarized signals VS, and horizontally polarized signals HS from the base station 110, and the adapter board 720 transmits the control signals, vertically polarized signals VS, and horizontally polarized signals HS to the passive antenna subsets 750*a* to 750*h*, so as to control the generation of the passive beams of the passive antenna subsets 750*a* to 750*h*.

Figure 8:
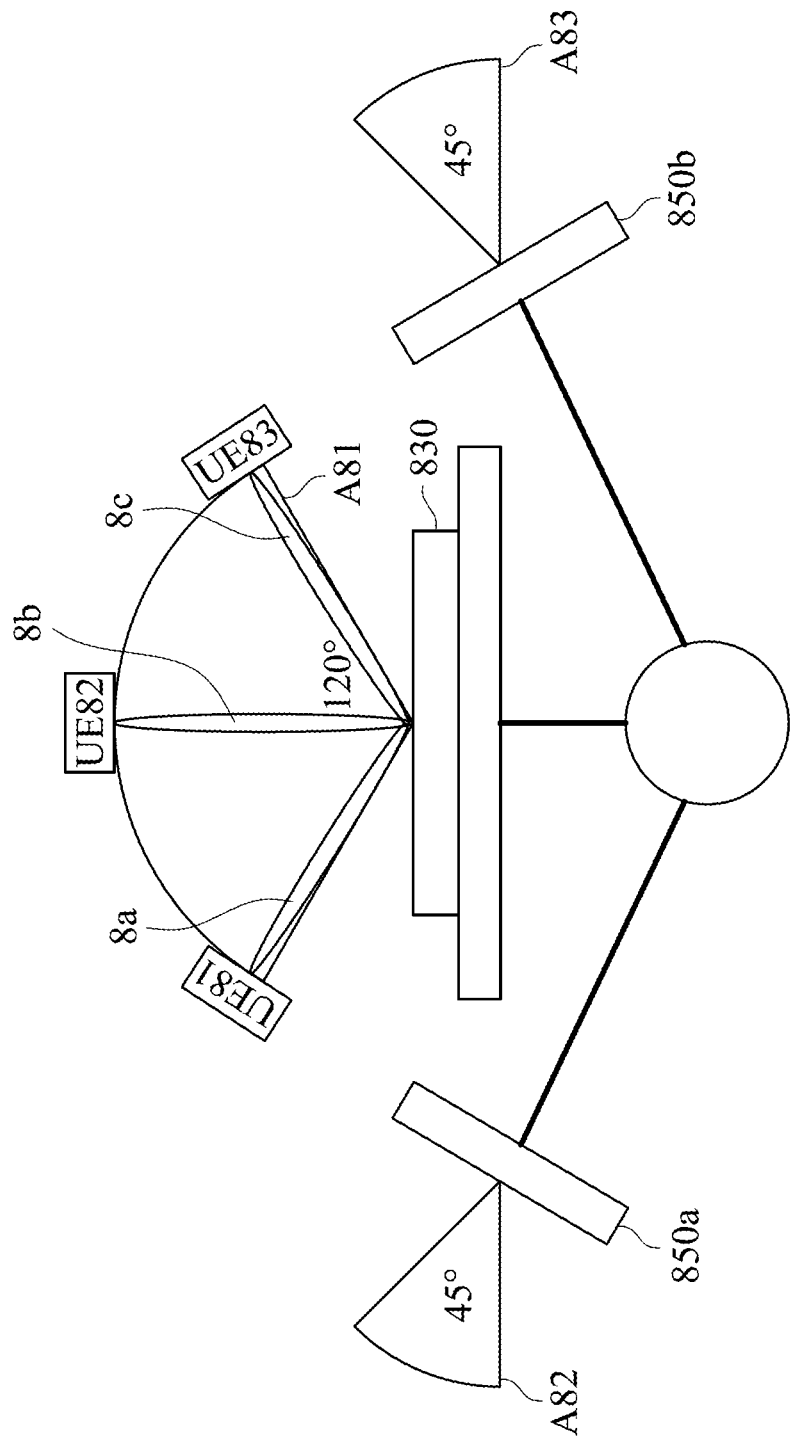
FIG. 8 is a schematic diagram illustrating an example of an operation of a communication system according to some embodiments of the present disclosure.

Reference is made to FIG. 8. FIG. 8 is a schematic diagram illustrating an example of an operation of a communication system 800 according to some embodiments of the present disclosure. The communication system 800 includes an active antenna array 830 and two passive antenna subsets 850*a*, 850*b*.

The active antenna array 830 covers an area A81 with 120 degrees, the passive antenna subset 850*a* covers an area A82 with 45 degrees, and the passive antenna subset 850*b* covers an area A83 with 45 degrees.

The active antenna array 830 can only serve one user equipment (UE) within the area A81 of 120 degrees of coverage at a time. If there are three user equipment, for example, user equipment UE81 to UE83 as illustrated in FIG. 8, within the area A81, beam scanning must be repeated and switching back and forth between different beams. The control circuit (for example, the control circuit 612 as illustrated in FIG. 6) controls the generation of the active beams 8*a*, 8*b*, and 8*c* so that the active beams 8*a*, 8*b*, and 8*c* are generated sequentially by transmitting control signals to the active antenna array 830. Each of the active beams 8*a*, 8*b*, and 8*c* corresponds to one of the user equipment UE81 to UE83. In some embodiments, the control circuit controls the generation of the active beams 8*a*, 8*b*, and 8*c* with time-division duplexing (TDD) by transmitting control signals to the active antenna array 830.

Figure 9B:
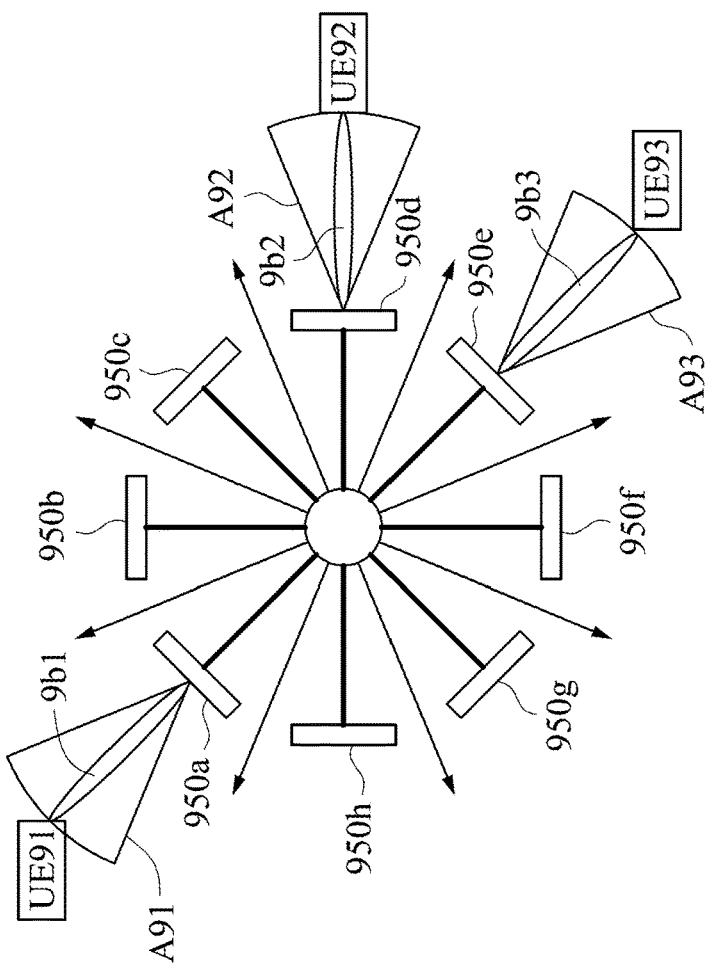
FIG. 9B is a schematic diagram illustrating an example of operations of a communication system according to some embodiments of the present disclosure.
Figure 9A:
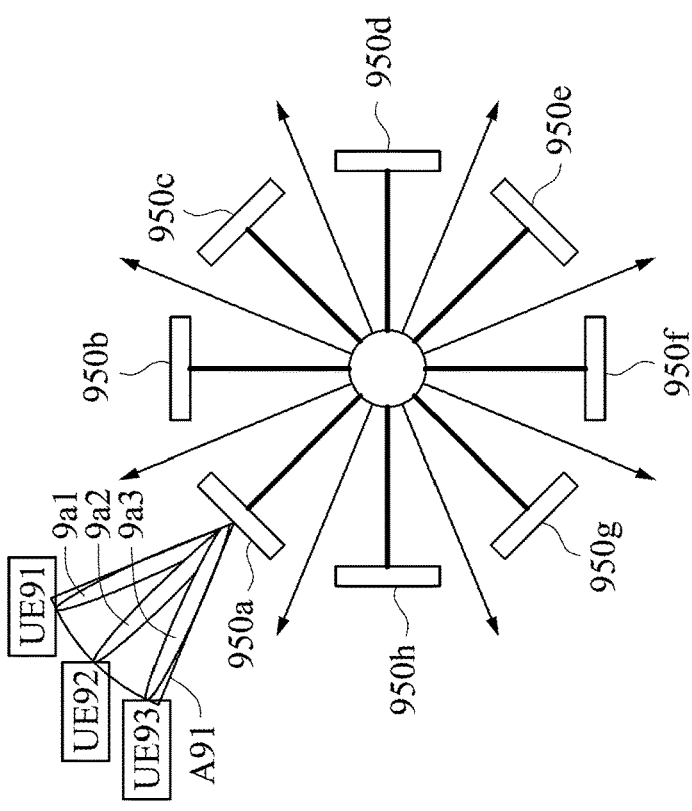
FIG. 9A is a schematic diagram illustrating an example of operations of a communication system according to some embodiments of the present disclosure.

References are made to FIG. 9A and FIG. 9B. FIG. 9A and FIG. 9B are schematic diagrams illustrating examples of operations of a communication system 900 according to some embodiments of the present disclosure. As illustrated in FIG. 9A and FIG. 9B, the communication system 900 includes several passive antenna subsets 950*a* to 950*h*.

In the example of FIG. 9A, three user equipment UE91 to UE93 are located within the area A91 of the passive antenna subset 950*a*. In detail, the user equipment UE91 corresponds to the passive beam 9*a*1 of the passive antenna subset 950*a*, the user equipment UE92 corresponds to the passive beam 9*a*2 of the passive antenna subset 950*a*, and user equipment UE93 corresponds to the passive beam 9*a*3 of the passive antenna subset 950*a*.

In some embodiments, the control circuit (for example, the control circuit 612 as illustrated in FIG. 6) controls the generation of the passive beams 9*a*1, 9*a*2, and 9*a*3 so that the passive beams 9*a*1, 9*a*2, and 9*a*3 are generated sequentially by transmitting control signals to the passive antenna subset 950*a*. In some embodiments, the control circuit controls the generation of the passive beams 9*a*1, 9*a*2, and 9*a*3 with time-division duplexing (TDD) by transmitting control signals to the passive antenna subset 950*a*.

In some other embodiments, the control circuit (for example, the control circuit 612 as illustrated in FIG. 6) controls the generation of the passive beams 9*a*1, 9*a*2, and 9*a*3 so that the passive beams 9*a*1, 9*a*2, and 9*a*3 are generated at the same time by transmitting control signals to the passive antenna subset 950*a*. That is, the passive antenna subset 950*a* can serve the user equipment UE1, UE2 and UE3 at the same time.

In the example of FIG. 9B, the user equipment UE91 is located within the area A91 of the passive antenna subset 950*a*, the user equipment UE92 is located within the area A92 of the passive antenna subset 950*d*, and user equipment UE93 is located within the area A93 of the passive antenna subset 950*e*. In detail, the user equipment UE91 corresponds to the passive beam 9*b*1 of the passive antenna subset 950*a*, the user equipment UE92 corresponds to the passive beam 9*b*2 of the passive antenna subset 950*d*, and user equipment UE93 corresponds to the passive beam 9*b*3 of the passive antenna subset 950*e*.

In some embodiments, the control circuit (for example, the control circuit 612 as illustrated in FIG. 6) controls the generation of the passive beams 9*b*1, 9*b*2, and 9*b*3 so that the passive beams 9*b*1, 9*b*2, and 9*b*3 are generated sequentially by transmitting control signals to the passive antenna subsets 950*a*, 950*d*, and 950*e*. In some embodiments, the control circuit generates the passive beams 9*b*1, 9*b*2, and 9*b*3 with time-division duplexing (TDD).

In some other embodiments, the control circuit (for example, the control circuit 612 as illustrated in FIG. 6) controls the generation of the passive beams 9*b*1, 9*b*2, and 9*b*3 so that the passive beams 9*b*1, 9*b*2, and 9*b*3 are generated at the same time by transmitting control signals to the passive antenna subsets 950*a*, 950*d*, and 950*e*. That is, the passive antenna subsets 950*a*, 950*d*, and 950*e* can serve the user equipment UE1, UE2 and UE3 at the same time.

Reference is made back to FIG. 8. Similar to the examples in FIG. 9A and FIG. 9B, the control circuit can control the generation of the passive beams of the passive antenna subsets 850*a* and 850*b* so that the passive beams of the passive antenna subsets 850*a* and 850*b* are generated either sequentially or at the same time by transmitting control signals to the passive antenna subsets 850*a* and 850*b*.

Reference is made to FIG. 10A to FIG. 10C. FIG. 10A to FIG. 10C are schematic diagrams illustrating passive antenna subsets 1000A to 1000C according to some embodiments of the present disclosure. As illustrated in FIG. 10A to 10C, in some embodiments, each of the passive antenna subsets 1000A to 1000C includes eight passive antenna arrays PB1 to PB8, while four of the passive antenna arrays PB1 to PB8 are vertically polarized antenna arrays, and the other four of the passive antenna arrays PB1 to PB8 are horizontally polarized antenna arrays.

As illustrated in FIG. 10A to 10C, the passive antenna arrays PB1 to PB8 can be arranged in different ways to form a passive antenna subset. The passive antenna arrays PB1 to PB8 can be passive beamformers. The passive beamformers are achieved by phases and gain control of feeding network of an antenna array.

Figure 11:
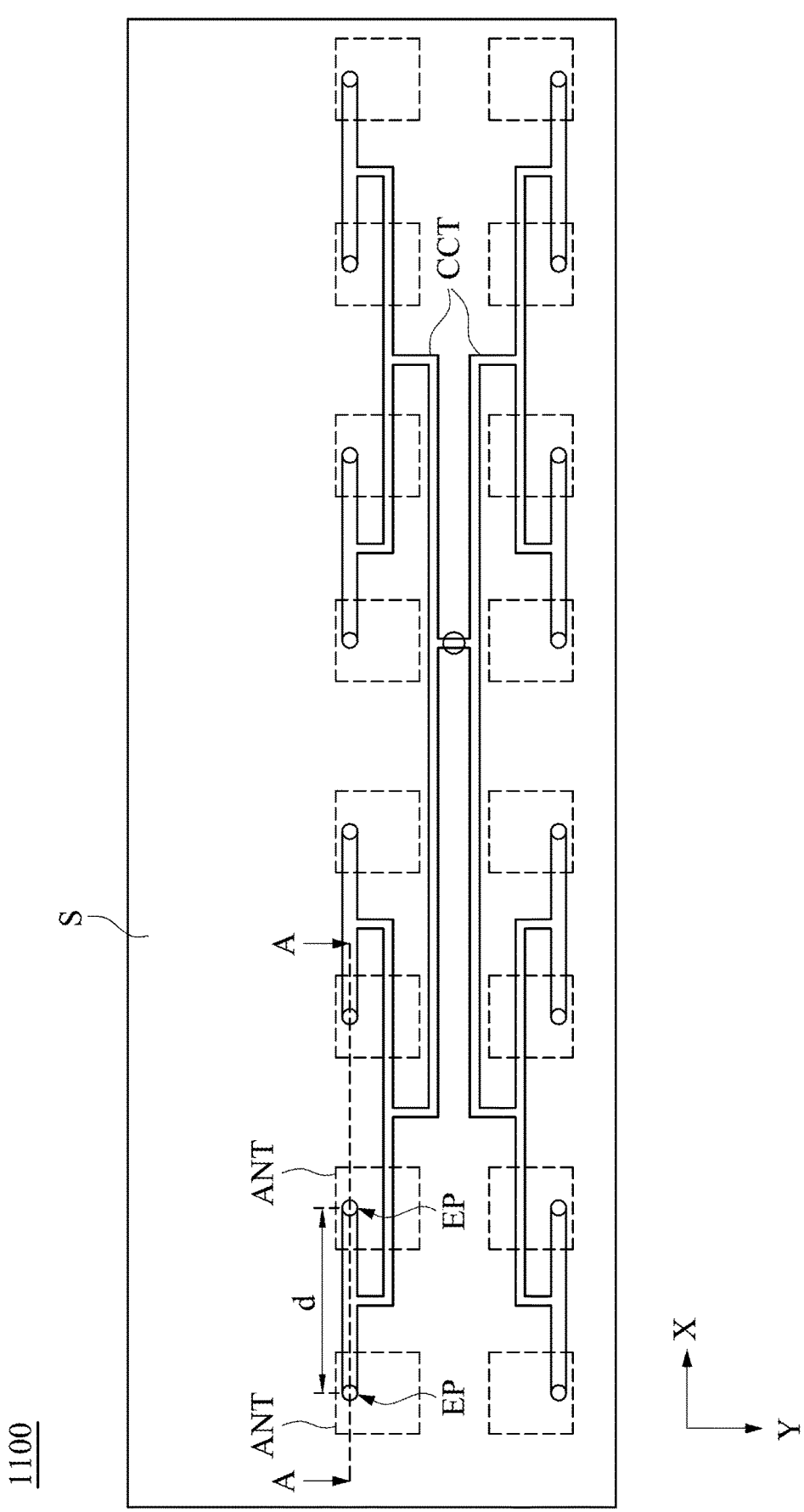
FIG. 11 is a top perspective view of a passive antenna array according to some embodiments of the present disclosure.
Figure 12:
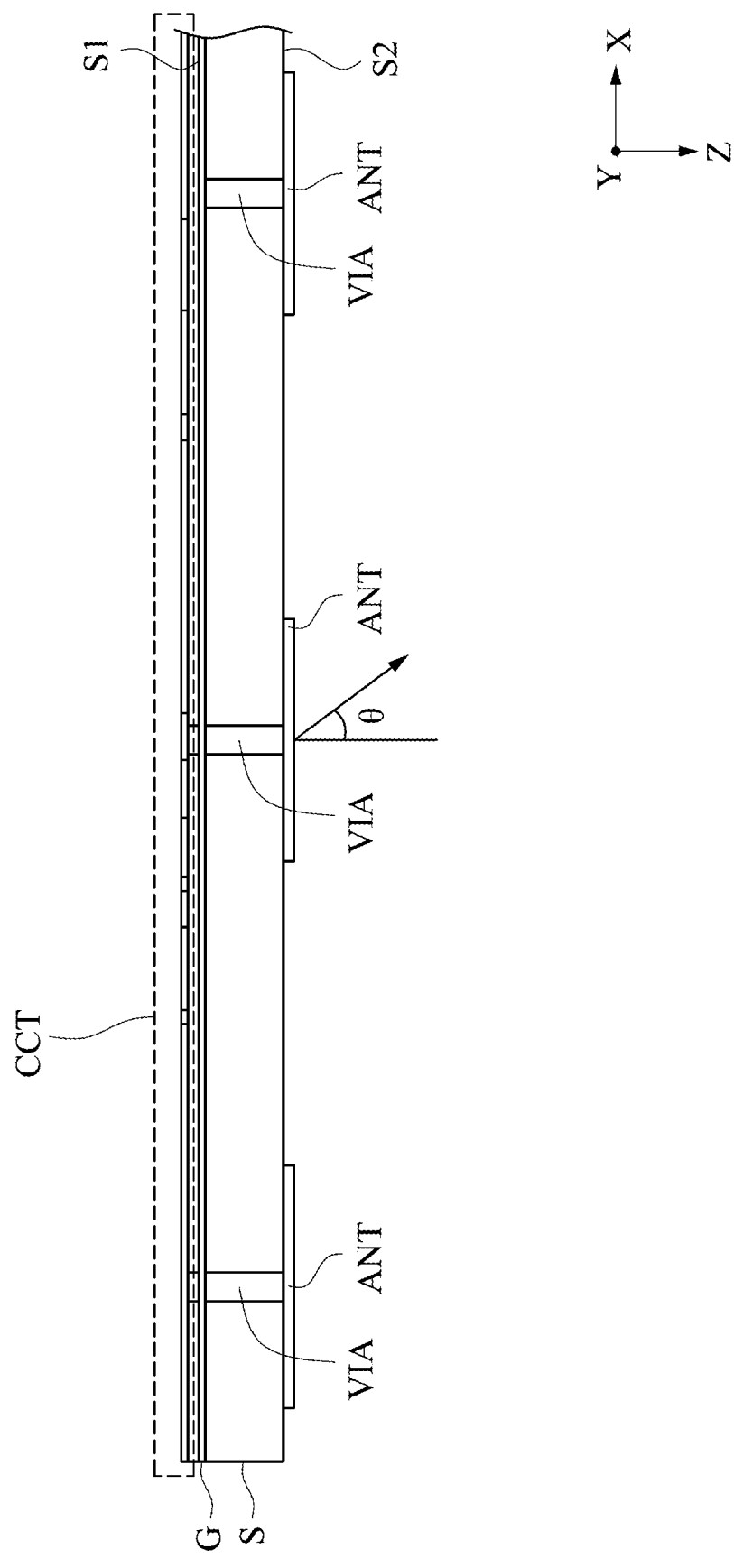
FIG. 12 is a side perspective view of a passive antenna array according to some embodiments of the present disclosure.

Reference is made to FIG. 11 and FIG. 12. FIG. 11 is a top perspective view of a passive antenna array 1100 according to some embodiments of the present disclosure. FIG. 12 is a side perspective view of a passive antenna array 1100 according to some embodiments of the present disclosure, where FIG. 12 is the side perspective view along a line segment from terminal point A to terminal point A of the passive antenna array 1100 of FIG. 11.

As illustrated in FIG. 11 and FIG. 12, the passive antenna array 1100 includes a substrate S, a ground layer G, a multi-branch circuit CCT, and multiple antenna elements ANT.

Notably, although this embodiment adopts a configuration in which a quantity of the multiple antenna elements ANT is 16 and the quantity of each row of the multiple antenna elements ANT is 8, to achieve requirement that a beam width is 11 degrees and antenna gain of a main beam needs to be more than or equal to 15 dB, the quantity of the multiple antenna elements ANT and the quantity of each row can also be adjusted according to other requirements of beamwidth and antenna gain.

Furthermore, the substrate S includes a first surface S1 and a second surface S2 corresponding to each other. The ground layer G is disposed between the first surface S1 and the second surface S2. In some embodiments, the substrate S can be a printed circuit board (PCB) made of an insulating material, where material of the substrate S can be Teflon (PTFE) or epoxy resin (FR4) and other materials commonly used to manufacture PCBs. In some embodiments, the ground layer G can be made of a metal material such as copper foil.

Furthermore, the multi-branch circuit CCT is disposed on the first surface S1, where the multi-branch circuit CCT includes a signal feeding terminal and multiple signal output terminals, where the multiple feeding branches are formed between the signal feeding terminal and the multiple signal output terminals. In some embodiments, the multi-branch circuit has multiple branch nodes in multiple stages to form the multiple feeding branches between the signal feeding terminal and the multiple signal output terminals.

In some embodiments, the multiple branch nodes can be multiple unequal Wilkinson power dividers, and the multiple unequal Wilkinson power dividers are used for improving isolation between the multiple antenna elements ANT to control antenna gain of the multiple antenna elements ANT, thereby reducing side lobe interference. In some embodiments, the multiple unequal Wilkinson power dividers are further used for controlling the antenna gain of the multiple antenna elements ANT by controlling the multiple power ratios between the multiple antenna elements ANT.

Furthermore, the multiple antenna elements ANT are disposed on the second surface S2, where the multiple antenna elements are connected to the multiple signal output terminals through respective via holes VIA, and are configured for beamforming. In some embodiments, a feeding point of each antenna elements ANT can be connected to corresponding signal output terminal through the corresponding via hole VIA.

Furthermore, a length difference between path lengths of the feeding branches of two adjacent antenna elements in a horizontal direction (i.e., +x direction) is configured for controlling a beam angle θ of the multiple antenna elements (i.e., an angle between directions of a generated beam of the multiple antenna elements ANT and a normal direction of the second surface S2). In some embodiments, the antenna element ANT can be a patch antenna or other antennas applicable to an antenna array. In other words, the multiple antenna elements ANT can form one or more antenna arrays, where the antenna arrays can be patch antenna arrays.

In some embodiments, when each of the multiple antenna elements ANT is a vertically polarized patch antenna, the multiple antenna elements ANT are disposed on the second surface S2 in a horizontal mirror plane from row to row. In addition, when each of the multiple antenna elements ANT is a horizontally polarized patch antenna, the multiple antenna elements ANT are disposed on the second surface S2 in a vertical mirror plane from column to column.

In some embodiments, a phase difference between two adjacent antenna elements ANT in the horizontal direction is proportional to the length difference. In some embodiments, the beam angle θ of the multiple antenna elements ANT is proportional to the length difference. In some embodiments, an antenna distance d between geometric center positions of the adjacent two of the multiple antenna elements ANT in the horizontal direction is one-half wavelength of a center frequency of a resonant frequency band of the multiple antenna elements ANT.

The passive beam direction of the passive antenna subsets in the present disclosure can be adjusted by using the path lengths of the feeding branches in the multi-branch circuit CCT.

Generally, in an active antenna array, the signal passes through the power divider to each antenna element of the antenna array, and then passes through the phase shifter, and finally the signal is amplified by the power amplifier, and the signal is then radiated through the antenna. In a passive antenna subset, the signals of each channel passes through the phase shifter, and the signal is radiated directly by the antenna elements without being amplified by the power amplifier.

In some embodiments, the control circuit of the present disclosure may include a central processing unit (CPU), a microprocessor (MCU), a server, or other computing circuits with data access, data calculation, data storage, data transmission and reception, or similar functions, or element.

In summary, the embodiments of the present disclosure provide a communication system with passive antenna subsets. Since the construction cost of the passive antenna subsets are lower than the construction cost of the active antenna arrays, the construction cost of the communication system can be lower. Moreover, since the power consumption of the passive antenna subsets is lower than the power consumption of the active antenna arrays, the passive antenna subsets can save power. Furthermore, by constructing the communication system with the passive antenna subsets, the design of the communication system can be more flexible. For example, for directions those include no users or for directions that do not need to provide service, no antenna subsets or antenna array is needed. Last, since the passive antenna subsets has the ability to enable several beams at the same time. When serving the user equipment, beam scanning is not needed. When serving several user equipment at the same time, the stability of the link generated according to the beams can be maintained. Compared with traditional methods, the throughput is improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system, comprising:
   an active antenna set, comprising at least one active antenna array, wherein the at least one active antenna array is configured to transmit a first signal through at least one active beam group, and the at least one active beam group covers a first coverage area with a first coverage angle; and a passive antenna set, comprising at least one passive antenna subset, wherein the at least one passive antenna subset is configured to transmit a second signal through at least one passive beam group, and the at least one passive beam group covers a second coverage area with a second coverage angle;

wherein the first coverage area and the second coverage area do not overlap.

2. The communication system of claim 1, wherein the at least one active antenna array comprises a first active antenna array, and the first active antenna array is configured to transmit the first signal through a first active beam group, wherein the first active beam group covers a first area with a first angle of 120 degrees;

wherein the at least one passive antenna subset comprises a first passive antenna subset, and the first passive antenna subset is configured to transmit the second signal through a first passive beam group, wherein the first passive beam group covers a second area with a second angle of 45 degrees.

3. The communication system of claim 1, wherein the at least one passive beam group and the at least one active beam group covers a third coverage area with a third coverage angle, and the third coverage angle is the first coverage angle plus the second coverage angle.

4. The communication system of claim 3, wherein the at least one active antenna array and the at least one passive antenna subset lies perpendicular to a first plane, and the at least one passive beam group and the at least one active beam group covers the third coverage area with the third coverage angle on the first plane.

5. The communication system of claim 1, wherein a first active antenna array of the at least one active antenna array comprises a first active beam group covering a first area with a first angle, and a first passive antenna subset of the at least one passive antenna subset comprises a first passive beam group covering a second area with a second angle, wherein the first area and the second area do not overlap.

6. The communication system of claim 5, wherein the first active antenna array comprises a first normal, the first passive antenna subset comprises a second normal, wherein the first active antenna array lies next to the first passive antenna subset, and a configuration angle between the first normal and the second normal is half of the first angle plus half of the second angle.

7. The communication system of claim 1, wherein the at least one passive antenna subset comprises:

a first passive antenna subset, configured to transmit a third signal through a first passive beam group, wherein the first passive beam group covers a first area with a first angle; and a second passive antenna subset, configured to transmit a fourth signal through a second passive beam group, wherein the second passive beam group covers a second area with a second angle;

wherein the first area and the second area do not overlap.

8. The communication system of claim 7, wherein the first passive antenna subset comprises a first normal, and the second passive antenna subset comprises a second normal, wherein when the first passive antenna subset lies next to the second passive antenna subset, a configuration angle between the first normal and the second normal is half of the first angle plus half of the second angle.

9. The communication system of claim 1, wherein the active beam group comprises a plurality of active beams and the passive beam group comprises a plurality of passive beams, wherein the communication system further comprises:

a control circuit, coupled to the active antenna set and the passive antenna set, wherein the control circuit controls a generation of each of the plurality of active beams so that the plurality of active beams are generated sequentially, and the control circuit controls a generation of each of the plurality of passive beams so that the plurality of passive beams are generated sequentially or at the same time.

10. The communication system of claim 1, further comprising:

a base station, comprising the active antenna set and a control circuit; and an adapter board, coupled to the base station and the passive antenna set;

wherein the control circuit controls the passive antenna set through the adapter board.

11. A communication system, comprising:

a plurality of passive antenna subsets, wherein each of the plurality of passive antenna subsets is configured to transmit a first signal through a passive beam group, wherein the passive beam group covers an area with a coverage angle, wherein the areas respectively covered by the plurality of passive antenna subsets through the passive beam groups are non-overlapped.

12. The communication system of claim 11, wherein the coverage angle of each of the plurality of passive antenna subsets are the same.

13. The communication system of claim 11, wherein the plurality of passive antenna subsets comprises:

a first passive antenna subset, configured to transmit a second signal through a first passive beam group covering a first area; and a second passive antenna subset, configured to transmit a third signal through a second passive beam group covering a second area;

wherein the first area and the second area do not overlap.

14. The communication system of claim 13, wherein the first passive antenna subset and the second passive antenna subset lie perpendicular to a first plane, and the first area and the second area do not overlap each other on the first plane.

15. The communication system of claim 13, wherein the first passive beam group and the second passive beam group covers a third area with a third angle, and the third angle is a first angle of the first area plus a second angle of the second area.

16. The communication system of claim 13, wherein when the first passive antenna subset lies next to the second passive antenna subset, a configuration angle between a first normal of the first passive antenna subset and a second normal of the second passive antenna subset is equal to the coverage angle.

* * * * *